(12) United States Patent
Park et al.

(10) Patent No.: US 9,268,925 B2
(45) Date of Patent: Feb. 23, 2016

(54) ELECTRONIC PAPER WITH MODE SWITCH UNIT

(71) Applicant: Samsung Electronics Co., Ltd., Gyeonggi-do (KR)

(72) Inventors: Sung-Jin Park, Seoul (KR);
Seong-Woon Kang, Gyeonggi-do (KR);
Young-Woong Kim, Seoul (KR);
Kyu-Suk Lee, Gyeonggi-do (KR);
Jong-In Lee, Gyeonggi-do (KR);
Kyung-Hoon Cha, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 235 days.

(21) Appl. No.: 13/916,049

(22) Filed: Jun. 12, 2013

(65) Prior Publication Data

US 2013/0333023 A1    Dec. 12, 2013

(30) Foreign Application Priority Data

Jun. 12, 2012 (KR) .......................... 10-2012-0062708

(51) Int. Cl.

| | |
|---|---|
| *G06F 3/02* | (2006.01) |
| *G06F 21/31* | (2013.01) |
| *G06F 3/14* | (2006.01) |
| *G09G 3/34* | (2006.01) |
| *G06F 3/046* | (2006.01) |
| *G06F 3/0354* | (2013.01) |
| *G02F 1/167* | (2006.01) |

(52) U.S. Cl.
CPC ............... *G06F 21/31* (2013.01); *G02F 1/167* (2013.01); *G06F 3/03545* (2013.01); *G06F 3/046* (2013.01); *G06F 3/14* (2013.01); *G09G 3/344* (2013.01); *G09G 2300/0426* (2013.01); *G09G 2300/08* (2013.01); *G09G 2310/0245* (2013.01); *G09G 2354/00* (2013.01); *G09G 2380/02* (2013.01); *G09G 2380/14* (2013.01)

(58) Field of Classification Search
CPC combination set(s) only.
See application file for complete search history.

(56) References Cited

U.S. PATENT DOCUMENTS

| | | | |
|---|---|---|---|
| 6,292,898 | B1 | 9/2001 | Sutherland |
| 2003/0173408 | A1 | 9/2003 | Mosher et al. |
| 2005/0125355 | A1 | 6/2005 | Fein |
| 2005/0181160 | A1 | 8/2005 | Schneider |
| 2006/0161977 | A1* | 7/2006 | Jung ...................... G06F 21/64 726/21 |
| 2009/0070122 | A1 | 3/2009 | Hauck et al. |
| 2009/0199004 | A1 | 8/2009 | Krawczewicz et al. |
| 2010/0306035 | A1 | 12/2010 | Fein |
| 2011/0138477 | A1 | 6/2011 | Jones et al. |
| 2011/0260829 | A1* | 10/2011 | Lee ....................... G06F 3/0414 340/5.51 |

FOREIGN PATENT DOCUMENTS

| | | |
|---|---|---|
| JP | 2009199216 | 9/2009 |
| KR | 1020090035920 | 4/2009 |

* cited by examiner

*Primary Examiner* — Tony N Ngo
(74) *Attorney, Agent, or Firm* — The Farrell Law Firm, P.C.

(57) ABSTRACT

Provided is electronic paper that includes an imaging sheet for displaying content, a memory for storing the content, a mode switch unit for manually setting an operation mode of the electronic paper, and a controller for performing at least one operation from a plurality of operations including encryption of the content stored in the memory, deletion of the content stored in the memory, deletion of content displayed on the imaging sheet from a screen, and display of a lock screen that requires input of a password on the imaging sheet, according to an operation mode that is set by a user using the mode switch unit.

7 Claims, 20 Drawing Sheets

FIG.13A
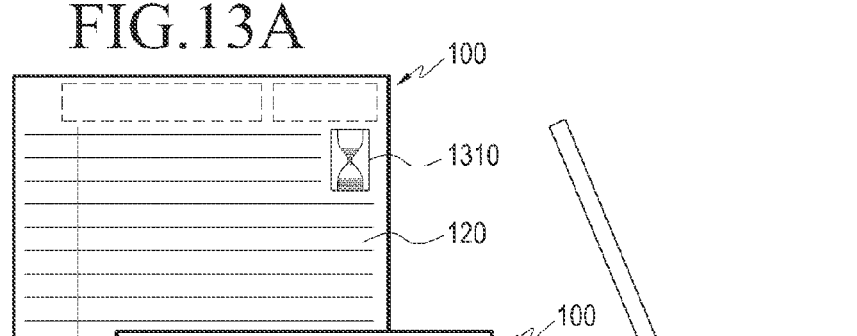
FIG.13B
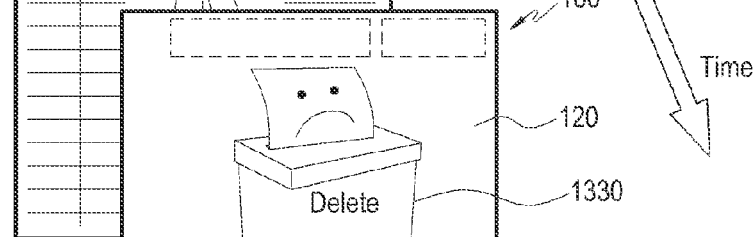
FIG.13C
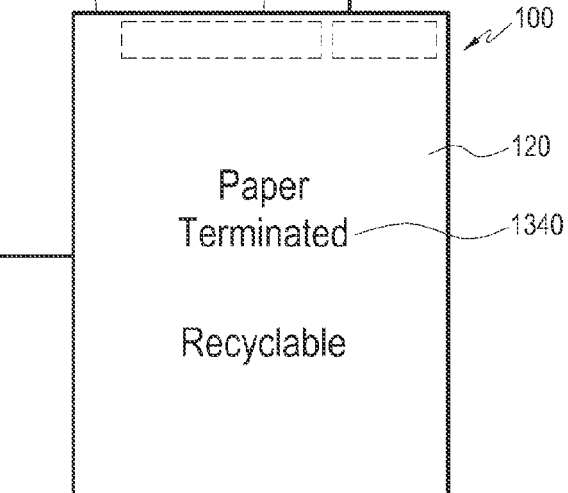
FIG.13D

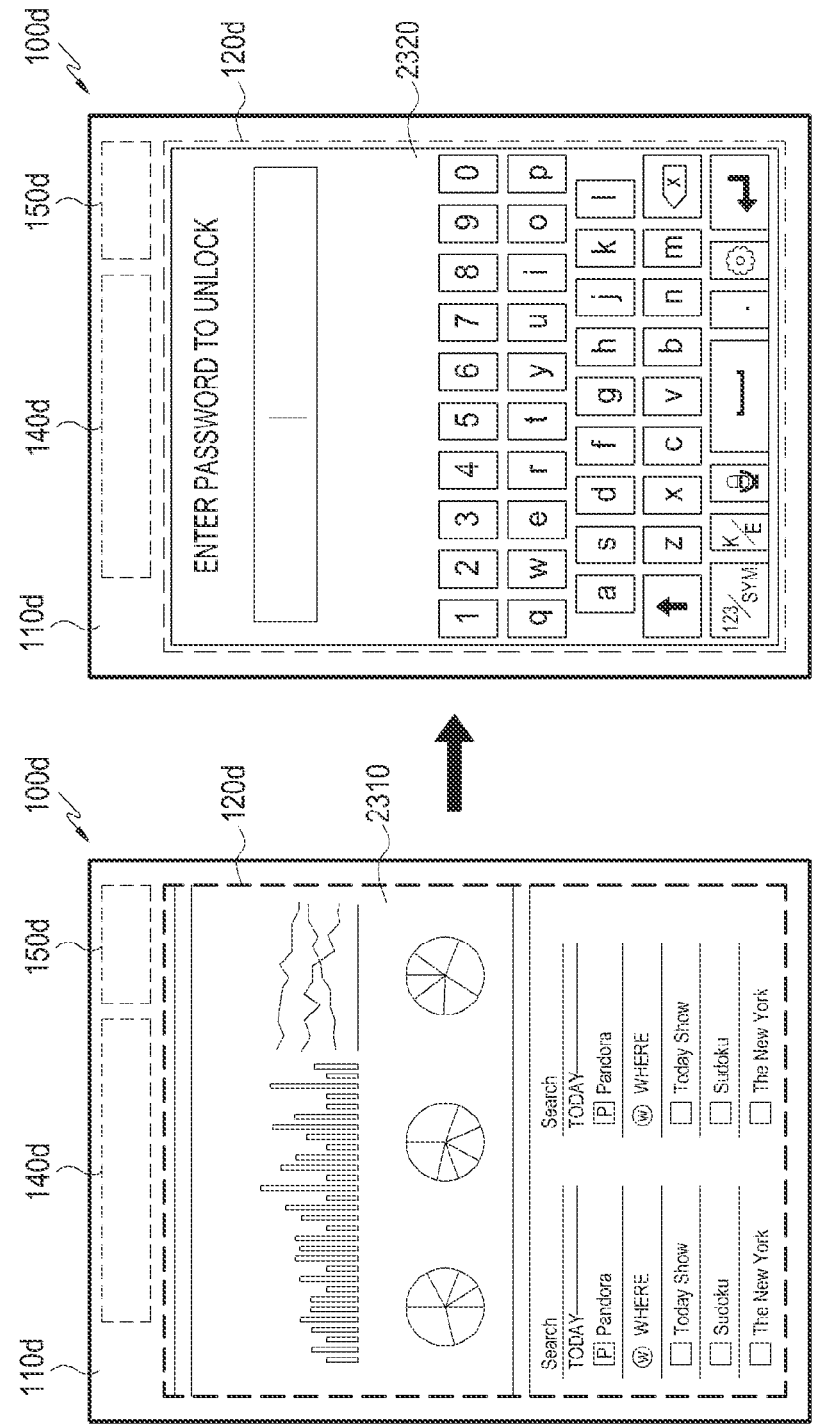

ELECTRONIC PAPER WITH MODE SWITCH UNIT

PRIORITY

This application claims priority under 35 U.S.C. §119(a) to Korean Patent Application Serial No. 10-2012-0062708, which was filed in the Korean Intellectual Property Office on Jun. 12, 2012, the entire disclosure of which is incorporated herein by reference.

BACKGROUND OF THE INVENTION

1. Field of the Invention

The present invention generally relates to electronic paper, and more particularly, to electronic paper having improved security.

2. Description of the Related Art

Various technologies have been developed for flexible displays, and recently, as technical completion or mass-production of flexible displays has been improved, the flexible displays have become applicable to various products. Since the flexible displays may be bent or folded like paper, they may be carried by change of shapes thereof. Moreover, the flexible displays are expected to guarantee portability because of their small volume. Meanwhile, a variety of attempts have been made to apply self-emitting techniques such as Organic Light Emitting Diodes (OLEDs) to portable phones or information terminals. As a technique in another form, electronic paper, like actual paper, has been released to the market as an electronic-book reader, and techniques for implementing electronic paper in a flexible form have been developed.

In the use of information terminals that are easy to carry, especially, in the use of electronic paper, a user's access and security problems have been an increasing concern, but there is still no perfect security solution. Due to absence of a security solution suitable for use behavior and use scenario of a user, access or usability is degraded and the effectiveness of electronic paper is negatively impacted.

SUMMARY OF THE INVENTION

The present invention has been made to address at least the problems and disadvantages described above, and to provide at least the advantages described below. Accordingly, aspects of the present invention provide electronic paper that may be used in a similar manner as conventional flexible, thin, and cheap paper and exhibits improved security.

According to an aspect of the present invention, there is provided electronic paper that includes an imaging sheet configured to display content, a memory configured to store the content, a mode switch unit configured to manually set an operation mode of the electronic paper, and a controller configured to perform at least one operation from a plurality of operations including encryption of the content stored in the memory, deletion of the content stored in the memory, deletion of content displayed on the imaging sheet from a screen, and display of a lock screen that requires input of a password on the imaging sheet, according to an operation mode that is set by a user using the mode switch unit.

BRIEF DESCRIPTION OF THE DRAWINGS

The above and other aspects, features and advantages of certain embodiments of the present invention will be more apparent from the following detailed description taken in conjunction with the accompanying drawings, in which:

FIGS. 12 and 13A-13D illustrate a first operation mode of an EPD panel according to an embodiment of the present invention;

FIGS. 22 and 23A-23B illustrate a fifth operation mode of an EPD panel according to an embodiment of the present invention.

DETAILED DESCRIPTION OF THE EMBODIMENTS OF THE PRESENT INVENTION

Figure 1:
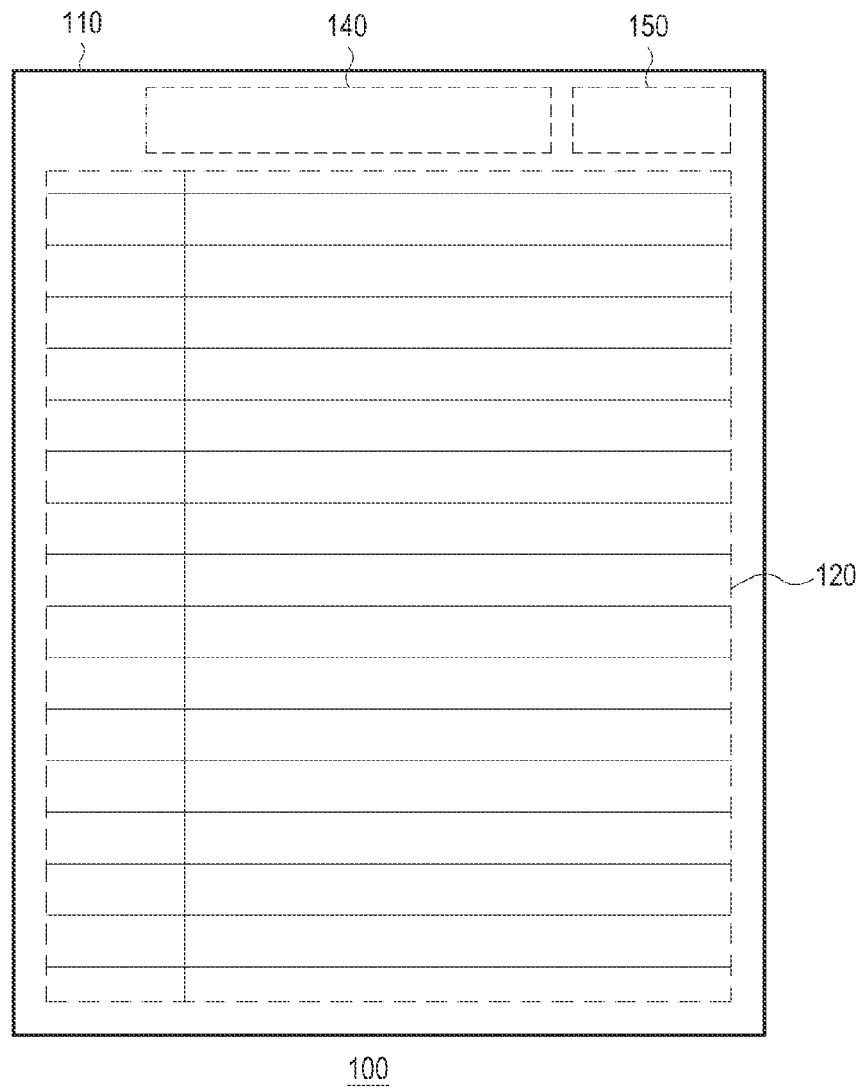
FIG. 1 is a diagram illustrating an Electrophoretic Display (EPD) panel according to an embodiment of the present invention.

Hereinafter, various embodiments of the present invention will be described with reference to the accompanying drawings. In the following description of the present invention, a detailed description of known functions and configurations incorporated herein will be omitted when it may obscure the subject matter of the present invention. Throughout the drawings, like reference numerals will be understood to refer to like parts, components, and structures.

Although ordinal numbers such as "first," "second," and so forth will be used to describe various components, those components are not limited by the terms. The ordinal terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

When it is mentioned that a component is "connected to" or "accessed by" another component, it may be understood that the component is directly connected to or accessed by the other component or that still another component is interposed between the two components. On the other hand, when it is mentioned that a component is "directly connected to" or "directly accessed by" to another component, it may be understood that no component is interposed there between.

The terminology used herein is for the purpose of describing embodiments only and is not intended to be limiting. As used herein, the singular forms are intended to include plural forms as well, unless the context clearly indicates otherwise. It will be further understood that the terms "comprises" and/or "has" when used in present disclosure, specify the presence of a stated feature, number, step, operation, component, element, or a combination thereof but do not preclude the presence or addition of additional features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

An Electrophoretic Display (EPD) panel, according to the present invention, displays content on an imaging sheet and senses a user input.

Although an EPD panel is described as an example of electronic paper herein, the present invention may be applied to electronic paper having an arbitrary structure or form which displays content through external ambient light without an internal illumination means. Therefore, the EPD panel may be expressed as electronic paper, and an EPD controller may be expressed as an electronic paper controller.

Figure 2:
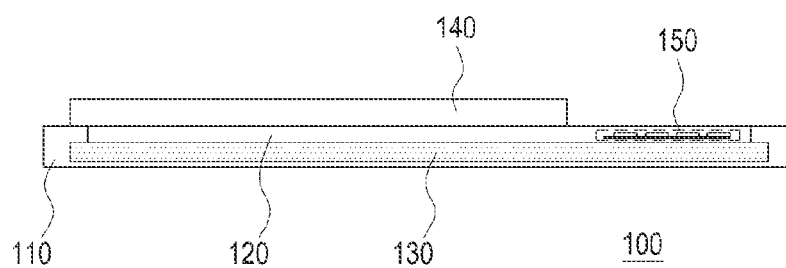
FIG. 2 is a cross-sectional view illustrating an EPD panel according to an embodiment of the present invention.

FIG. 1 is a diagram illustrating an EPD panel 100 according to an embodiment of the present invention, and FIG. 2 is a cross-sectional view illustrating the EPD panel 100.

The EPD panel 100 includes a cover sheet 110 for protecting other components in the EPD panel 100, an imaging sheet 120 for displaying content, a touch sensor 130 for sensing a user input, a main board 140 for driving the imaging sheet 120 and transferring content stored inside or received from outside in the form of an image according to a user command or menu selection input through the touch sensor 130, and a mode switch unit 150. The content includes a menu screen, a still image (e.g., a picture), a document (e.g., a digital book, a digital newspaper, a web page, etc.), and so forth. The main board 140 and the mode switch unit 150 are positioned on the EPD panel 100, such that the EPD panel 100 has a legal notepad structure which is a user-friendly structure that mainly uses a legal notepad and turns over paper.

The cover sheet 110 forms an outer surface of the EPD panel 100 together with a top surface of the imaging sheet 120 to protect other components in the EPD panel 100. The cover sheet 100 may be formed of a synthetic resin or plastic material such as polyamid, Polyethylene Terephthalate (PET), or the like. The cover sheet 110 may have the form of a rectangular plate in a center portion of which a groove for receiving the imaging sheet 120 is formed. In another embodiment, the cover sheet 110 may have a form which completely encloses other components in the EPD panel 100 including the imaging sheet 120.

The cover sheet 110 is selectively applied to the EPD panel 100, and instead of the cover sheet 110, lower and upper substrates of the imaging sheet 120 may be bonded or adhered to each other to completely enclose other components in the EPD panel 100. In the following description, selective application of an element means that the element may be removed.

The imaging sheet 120 is structured such that pixels having the same configuration are arranged in an N×M matrix. The image displayed on a screen of the imaging sheet 120 (i.e., the top surface of the imaging sheet 120) includes a group of points expressed by the pixels.

Figure 3:
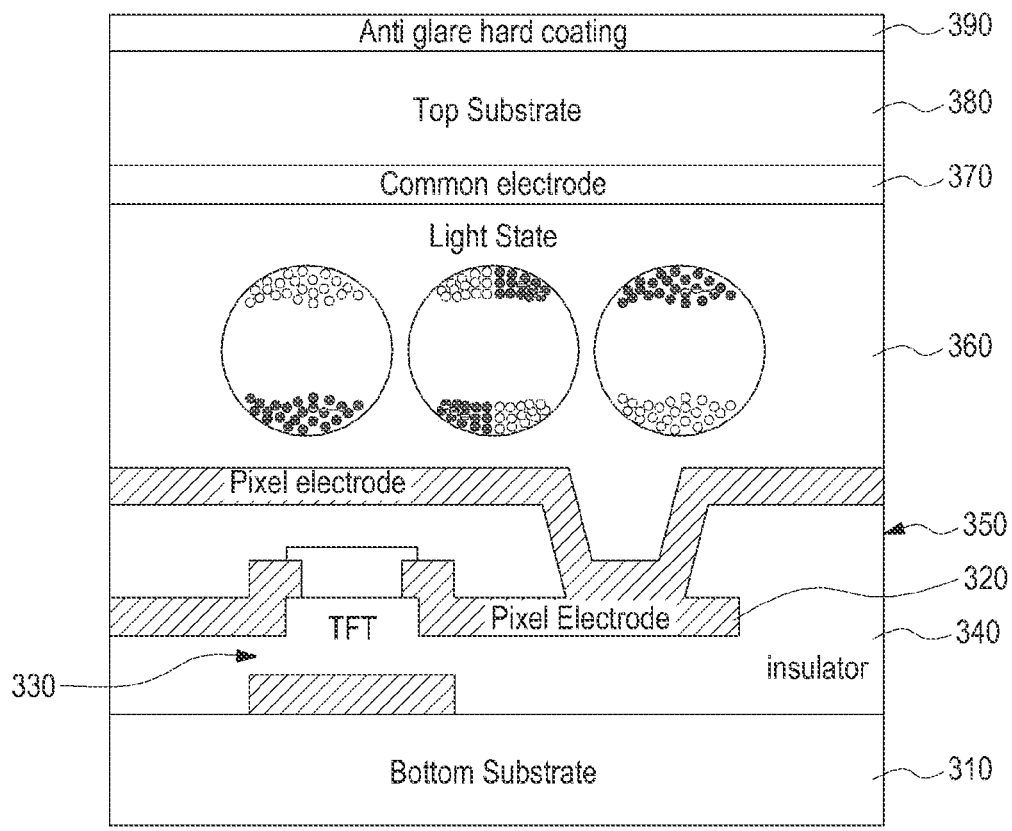
FIG. 3 is a cross-sectional view illustrating one pixel of an imaging sheet according to an embodiment of the present invention.

FIG. 3 is a cross-sectional view illustrating a pixel of the imaging sheet 120. A material and a thickness of each component of the imaging sheet 120 are configured to have flexible and thin characteristics.

The imaging sheet 120 is illuminated by ambient light from an external environment, and displays content through reflection or absorption of light.

The imaging sheet 120 includes a lower substrate 310, an organic electronic backplane 350, an ink layer 360, a common electrode layer 370, an upper substrate 380, and a hard coating layer 390, which are sequentially stacked in this order.

The lower and upper substrates 310 and 380 protect the ink layer 360, the electrode layers of the backplane 350, and the common electrode layer 370, and may be formed of a synthetic resin or plastic material such as polyamid or PET, which ensures heat resistance, high transmission features, and good writing sensation. The lower substrate 310 may have a thickness of 20 μm-30 μm, and preferably, a thickness of 22.5 μm-27.5 μm.

The hard coating layer 390 is stacked on a top surface of the upper substrate 380, and may have an anti-glare function. For example, the hard coating layer 390 may be formed of a material in which a light-scattering agent is added to a typical hard coating agent. The hard coating layer 390 may be selectively applied to the upper substrate 380, and a combined thickness of the hard coating layer 390 and the upper substrate 380 may be within a range of 24 μm-36 μm, or preferably, a range of 27 μm-33 μm.

The ink layer 360 expresses a color and/or a black/white image pattern through movement of particles based on an applied electric field (i.e., an electrophoresis phenomenon), and displays an image through reflection or absorption of external light incident to the pattern. For example, the ink layer 360 is configured so that microcapsules filled with transparent fluid containing white and black particles are disposed between the organic electronic backplane 350 and the common electrode layer 370, such that by applying the electric field to the respective microcapsules, a black or white image pattern is expressed. For example, a white particle is charged with a positive (+) charge and a black particle is charged with negative (−) charge, such that they move in opposite directions by the applied electric field. The image pattern of the ink layer 360 is maintained until an electric field changes. The ink layer 360 may express a color image pattern, and such color expression may be implemented by stacking a color filter on the ink layer 360 or using coloring particles instead of black/white particles as particles of the ink layer 360.

The common electrode layer 370 is interposed between the ink layer 360 and the upper substrate 380, maintains a constant electric potential, and may be connected to ground. a combined thickness of the common electrode layer 370 and the ink layer 360 may be within a range of 32 μm-48 μm, or preferably, a range of 36 μm-44 μm.

The organic electronic backplane 350 includes a plurality of pixels, each of which includes a pixel electrode 320 and a Thin Film Transistor (TFT) 330 which are partially or entirely filled in the insulating layer 340 or are partially or entirely stacked on a top surface of the insulating layer 340. The common electrode layer 370 and conductive portions of the organic electronic backplane 350, such as the pixel electrode 320 and the TFT 330, are formed of carbon-containing organic materials, an example of which may be graphene. The organic electronic backplane 350 may have a thickness of 4 µm-6 µm, and preferably, a thickness of 4.5 µm-5.5 µm.

The imaging sheet 120 as a whole may have a thickness of 0.08 mm-0.2 mm, and preferably, a thickness of 0.09 mm-0.11 mm. The imaging sheet 120 may form single electronic paper, which may have a thickness of 0.08 mm-0.2 mm, and preferably, a thickness of 0.09 mm-0.11 mm.

Figure 4:
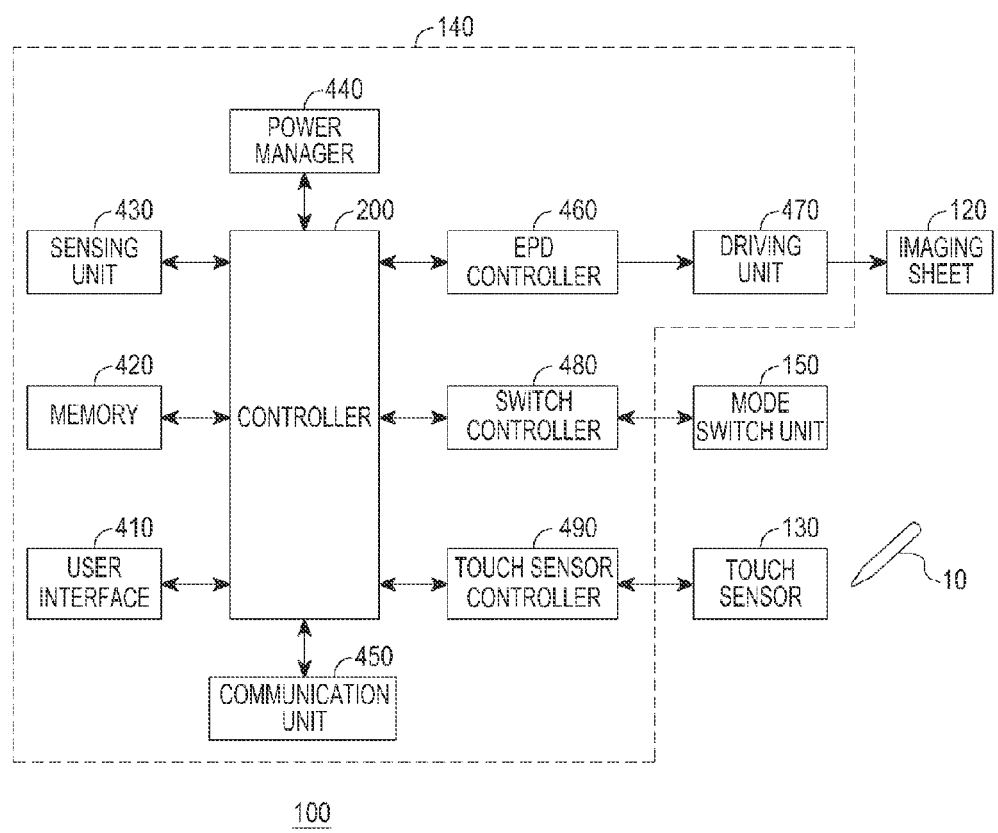
FIG. 4 is a diagram illustrating a configuration of a main board according to an embodiment of the present invention.

FIG. 4 illustrates a configuration of the main board 140.

The main board 140 includes a sensing unit 430, a memory 420, a user interface 410, a communication unit 450, a power manager 440, an EPD controller 460, a driving unit 470, a touch sensor controller 490, a switch controller 480, and a controller 200. The EPD controller 460, the touch sensor controller 490, and the switch controller 480 may alternatively be integrated into the controller 200, and their functions may be executed by the controller 200.

The EPD panel 100 may execute an image transfer operation by collaborating with an external device. The EPD panel 100 receives user-desired content through a communication network such as Internet, and transfers an image indicating the content to the imaging sheet 120. For example, the EPD panel 100 may operate under control of the external device, which may be implemented in various ways.

The communication unit 450 may be a wired or wireless communication unit, and may transmit data from the controller 200 or receive data from an external communication line or over the air and deliver the data to the controller 200.

The communication unit 450 may include at least one of a mobile communication module, a wireless Local Area Network (LAN) module, and a short-range Near Field Communication (NFC) module, depending on its functionality.

The mobile communication module enables the EPD panel 100 to be connected with an external device through mobile communication by using one or more antennas (not shown) under control of the controller 200. The mobile communication module transmits/receives a radio signal for voice communication, video communication, a Short Messaging Service (SMS), or a Multimedia Messaging Service (MMS) with a cellular phone (not shown), a smart phone (not shown), a tablet PC (not shown), or another device (not shown), which has a phone number input into the EPD panel 100.

The WLAN module may be connected to the Internet under control of the controller 200 in a place where a wireless Access Point (AP, not shown) is installed. The WLAN module supports a WLAN standard (IEEE802.11x) of the Institute of Electrical and Electronics Engineers (IEEE). The NFC module may wirelessly perform NFC between the EPD panel 100 and an image forming apparatus (not shown) under control of the controller 200. The NFC may include, for example, Bluetooth®, Infrared Data Association (IrDA), and so forth.

The user interface 410 enables reception of a user input or output of information to a user, and may include a plurality of buttons, a microphone, a speaker, a vibration motor, a connector, a keypad, a touch screen, and so forth.

Buttons may be formed on a front surface, a side surface, or a rear surface of the main board 140, and may include a power/lock button (not shown), a volume button (not shown), a menu button, a home button, a back button, and a search button.

A microphone receives input of voice or sound and generates an electric signal under control of the controller 200.

A speaker may output sound corresponding to various signals (e.g., a wireless signal, a broadcast signal, a digital audio file, a digital moving image file, a captured picture, or the like) to outside the EPD panel 100 under control of the controller 200. The speaker may output sound corresponding to a function executed by the EPD panel 100. A single or multiple speakers may be formed in a proper position or proper positions of the main board 140.

A vibration motor may convert an electric signal into mechanical vibration under control of the controller 200. For example, when the EPD panel 100 is in a vibration mode and receives a voice call from another device (not shown), the vibration motor operates. A single vibration motor or multiple vibration motors may be formed in the main board 140. The vibration motor may operate in response to a user's touch on the touch screen and continuous movement of the touch on the touch screen.

A connector may be used as an interface for connecting the EPD panel 100 with the external device or a power source (not shown). Under control of the controller 200, through a wired cable connected to the connector, data stored in the memory 420 of the EPD panel 100 may be transmitted to or received from the external device. Through the wired cable connected to the connector, power may be received from a power source to operate the EPD panel 100 or to charge a battery.

A keypad may receive a key input from the user of the EPD panel 100. The keypad may include a physical keypad formed in the main board 140 or a virtual keypad displayed on the imaging sheet 120.

The touch sensor 430 includes at least one sensor for detecting a state of the EPD panel 100. For example, the sensing unit 430 may include a proximity sensor for detecting the user's proximity to the PED panel 100, a motion/orientation sensor for detecting a motion (e.g., rotation, acceleration, deceleration, vibration, etc.) of the EPD panel 100, and a camera module. The motion/orientation sensor may include, for example, an acceleration sensor, a gravity sensor, a shock sensor, a Global Positioning System (GPS) module, a compass, and so forth. The sensing unit 430 detects a state of the EPD panel 100, generates a signal corresponding to the detection of the state, and transmits the generated signal to the controller 200. For example, a GPS module may receive signals from a plurality of GPS satellites (not shown) around the earth's orbit and may calculate the position of the EPD panel 100 by using a time of arrival from the GPS satellite (not shown) to the EPD panel 100. The compass calculates a posture or orientation of the EPD panel 100.

The camera module captures a still image or a moving image and delivers the captured image to the controller 200 and/or stores the image in the memory 420, under control of the controller 200.

The controller 200 controls overall operations of the EPD panel 100 and controls other components in the EPD panel 100 to perform an image transfer operation. In the following description, the term "controller" may refer to the controller 200, but to distinguish over other controllers, the controller 200 may also be referred to as a main controller. The controller 200 may include a single-core, dual-core, triple-core, or quad-core processor. The controller 200 may receive a broadcast signal (for example, a TV broadcast signal, a radio broadcast signal, or a data broadcast signal) and broadcast additional information (for example, an Electric Program Guide (EPG) or an Electric Service Guide (ESG)) transmitted from a broadcasting station through the communication unit 450. The controller 200 may reproduce a digital audio file (for example, a file having a file extension such as 'mp3', 'wma', 'ogg', or 'way') stored in the first memory 420 or received through the communication unit 450. The controller 200 may reproduce a digital video file (for example, a file having a file extension such as 'mpeg', 'mpg', 'mp4', 'avi', 'mov', or 'mkv') stored in the memory 420 or received through the communication unit 450. The controller 200 may transfer contents stored in the memory 420 or received through the communication unit 450 to the imaging sheet 120 in the form of an image according to a user command or menu selection input through the user interface 410 or the touch sensor 130. The image may be a still or moving image.

The memory 420 stores a signal or data under control of the controller 200. The memory 420 stores an operating program, a control program, a security application, multimedia applications, contents, and user setting for control of the EPD panel 100 or the controller 200.

A term "memory" includes a Read Only Memory (ROM) or a Random Access Memory (RAM) in the controller 200 or a memory card (not shown) (for example, a Secure Digital (SD) card or a memory stick), a non-volatile memory, a volatile memory, a Hard Disk Drive (HDD), or a Solid State Drive (SSD) mounted on the EPD panel 100.

The power manager 440 may supply power to the EPD panel 100 under control of the controller 200. The power manager 440 may be connected to one or more batteries (not illustrated). The power manager 440 may also supply power, which is received from an external power source (not illustrated) through a wired cable connected with the connector, to the EPD panel 100.

The EPD controller 460 outputs a control signal, which drives the imaging sheet 120, to the driving unit 470 under control of the controller 200 and according to a preset EPD driving algorithm. The controller 200 may control the imaging sheet 120 to adjust or update content displayed on the imaging sheet 120 according to user input information.

Figure 5:
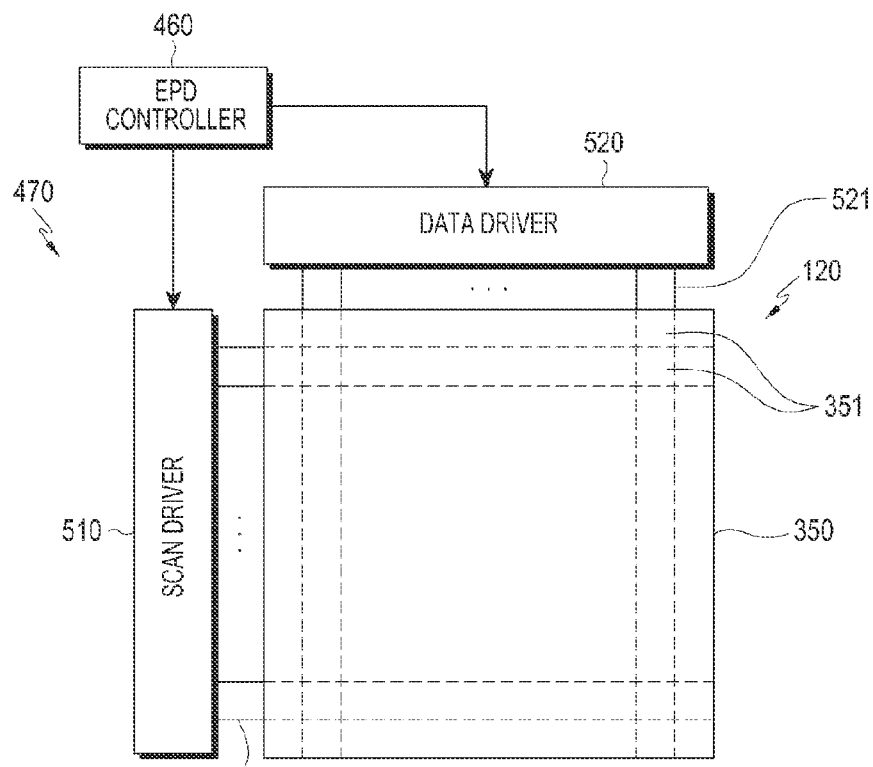
FIG. 5 is a diagram describing a method for driving an imaging sheet according to an embodiment of the present invention.
Figure 6:
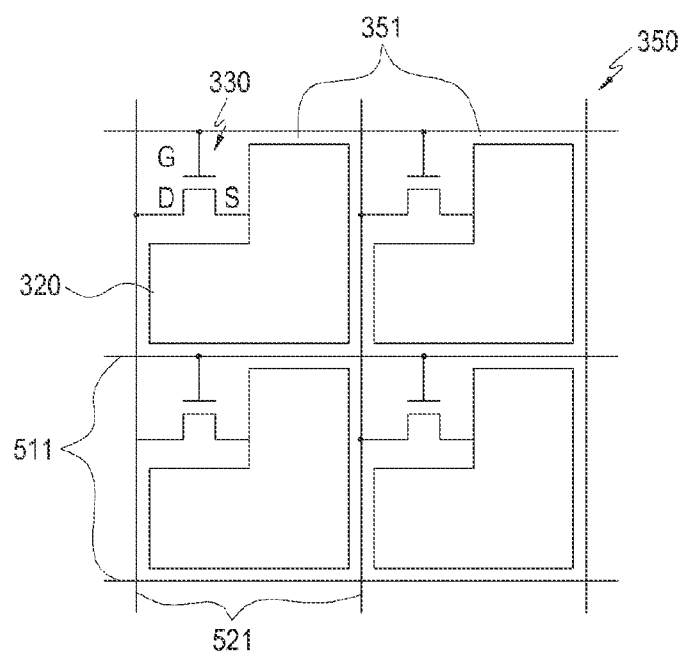
FIG. 6 is a circuit diagram of an organic electronic backplane according to an embodiment of the present invention.

FIG. 5 is a diagram describing a method for driving the imaging sheet 120, and FIG. 6 is a circuit diagram of the organic electronic backplane 350.

The driving unit 470 generates address signals (that is, row signals) and data signals (that is, column signals) according to a control signal for image display, which is input from the EPD controller 460, and outputs the address signals and the data signals to the organic electronic backplane 350. The driving unit 470 includes a scan driver 510 and a data driver 520. The scan driver 510 sequentially supplies address signals to scan lines 511 under control of the EPD controller 460, and the data driver 520 supplies data signals to data lines 521 under control of the EPD controller 460.

The organic electronic backplane 350 includes a plurality of pixels 351, each of which includes a pixel electrode 320 and a Thin Film Transistor (TFT) 330. Each pixel electrode 320 is connected to a scan line 511 and a data line 521 through the TFT 330. Each TFT 330 includes a gate (G), a drain (D), and a source (S), in which the gate is connected with the scan line 511, the drain is connected with the data line 521, and the source is connected with the pixel electrode 320. Each TFT 330 functions as an on/off switch, such that the TFT 330 is in an on state when signals are supplied to both the scan line 511 and the data line 521. A voltage is applied to the pixel electrode 320 when the TFT 330 is in the on state. Referring to FIG. 3, the ink layer 360 expresses an image pattern through movement of particles based on an electric field applied between the common electrode 370 and the organic electronic backplane 350. The ink layer 360 has an image pattern corresponding to the foregoing image transferring operation, and the image pattern is maintained until the next image transferring operation is performed.

Referring back to FIG. 4, the imaging sheet 120 may provide a user interface corresponding to various services (for example, call, data transmission, broadcasting, picture/moving image capturing) to the user. The touch sensor 130 transmits an analog signal corresponding to at least one touch that is input by the user to the controller 200. The touch sensor 130 receives at least one touch through a user's body (for example, a finger) or a touch input device (for example, a stylus pen). The touch sensor 130 receives continuous movement of the at least one touch. The touch sensor 130 transmits an analog signal corresponding to the received continuous movement of the touch to the controller 200.

In the present invention, the touch may include a contactless touch (e.g., a detectable distance of 1 mm or less between the touch screen and the user's body or the touch input means) as well as a contact between the touch screen and the user's body or the touch input means. The touch screen may be of, for example, a resistive type, a capacitive type, an infrared type, or an acoustic wave type.

The touch sensor controller 490 outputs a control signal to the touch sensor 130 for driving the touch sensor 130 according to control of the controller 200 and a preset touch sensor driving algorithm, and outputs user input information input to the touch sensor 130 using a user input means such as a pen 10 to the controller 200. The controller 200 controls the EPD controller 460 to adjust or update content displayed on the EPD panel 100 according to user input information.

Figure 7:
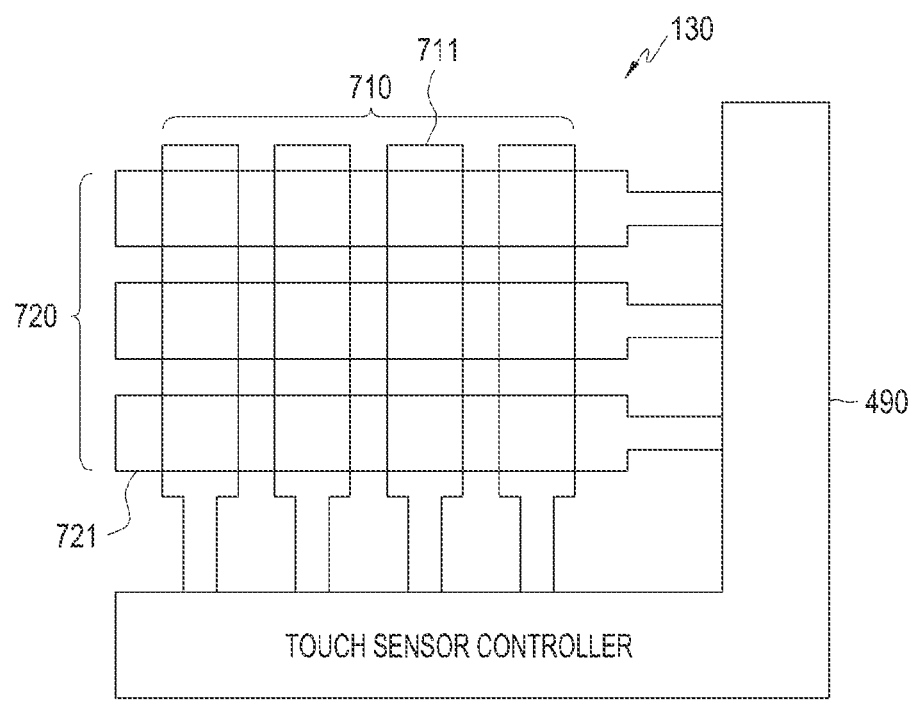
FIG. 7 illustrates a touch sensor and a touch sensor controller according to an embodiment of the present invention.

FIG. 7 illustrates the touch sensor 130 and the touch sensor controller 490.

The touch sensor 130 is a touch sensor of an Electromagnetic Resonance (EMR) type, which includes first and second loop units 710 and 720. The touch sensor 130 operates under control of the touch sensor controller 490 and outputs detected signals to the touch sensor controller 490. The first loop unit 710 includes multiple first loops 711, and the second loop unit 720 includes multiple second loops 721.

The first loop unit 710 and the second loop unit 720 may be disposed orthogonal to each other.

The first loop unit 710 extends longer in the y-axis direction than in the x-axis direction, thus being used to sense an x-axis coordinate of a pen input position (or a user input position or touch position).

The second loop unit 720 extends longer in the x-axis direction than in the y-axis direction, thus being used to sense a y-axis coordinate of a pen input position.

The first and second loops 711 and 721 output first signals of a first frequency in the form of electric signals that are input from the touch sensor controller 490, in the form of electromagnetic waves. The first and second loops 711 and 721 detect second signals of a second frequency in the form of electromagnetic waves that are output from an external pen, in the form of electric signals, and output them to the touch sensor controller 490.

A pen situated around the touch sensor 130 receives the first signals in the form of electromagnetic waves that are output from the touch sensor 130, and generates and outputs the second signals in the form of electromagnetic waves to outside according to operations of a resonance circuit. The pen 10 is merely illustrative and may be any means capable of outputting the second signals of the second frequency according to input of the first signals of the first frequency. Such means may be collectively referred to as a user input means. The pen 10 includes a resonance circuit having a coil and a condenser, a position of which may be sensed by the EMR type touch sensor 130.

Figure 8:
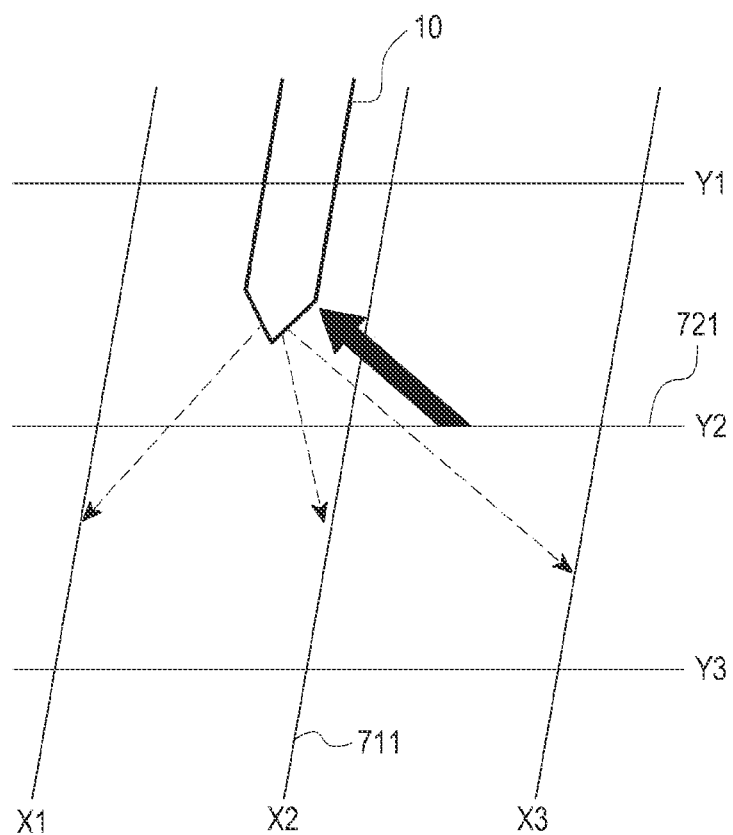
FIGS. 8 and 9 are diagrams describing a method for detecting a pen input position according to an embodiment of the present invention.
Figure 9:
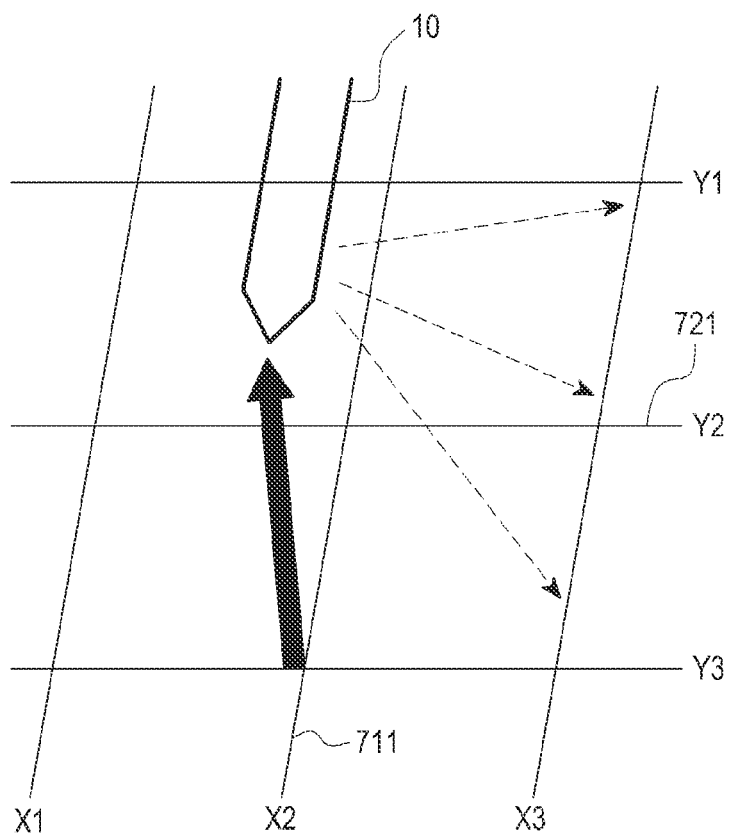

FIGS. 8 and 9 are diagrams describing a method for detecting a pen input position. In FIGS. 8 and 9, each of the first and second loops 711 and 721 is simplified as one line.

Referring to FIG. 8, the Y2 loop 721 outputs the first signals to outside. The pen 10 receives the first signals in the form of electromagnetic waves, generates the second signals in the form of electromagnetic waves according to operations of the resonance circuit, and outputs the generated second signals to outside. The X1, X2, and X3 loops 711 sequentially detect the second signals in the form of electric signals. The touch sensor controller 490 derives an x-axis coordinate of the pen input position from a second signal having a peak voltage value that is higher than a threshold value, which is output from the X2 loop 711, among the second signals.

Referring to FIG. 9, the X2 loop 711 outputs the first signals to outside. The pen 10 receives the first signals in the form of electromagnetic waves, generates the second signals in the form of electromagnetic waves according to operations of the resonance circuit, and outputs the second signals to outside. The Y1, Y2, and Y3 loops 721 sequentially detect the second signals in the form of electric signals. The touch sensor controller 490 derives a y-axis coordinate of the pen input position from a second signal having a peak value that is higher than the threshold value, which is output from the Y2 loop 721, among the second signals.

The mode switch unit 150 is used to set usage, security level, operation mode, and so forth of the EPD panel 100. The mode switch unit 150 may include an electrode line pattern whose on/off states may be set by the user, a mechanical switch such as a dome switch, and an electronic switch. The mode switch unit 150 includes one of the following switch types:
  a switch that cuts a circuit by perforating or tearing the circuit and thus is turned on or off;
  a switch in which mode setting is performed by folding a bendable portion, in which, when the switch is bent, a circuit is mechanically broken or physically cut and the mode setting is maintained;
  a switch in which mode setting is performed by pressing the switch like a button, in which, once the switch is pressed, the switch is not restored and a special device is used for restoration;
  a switch that cuts a circuit when a conductive line is disposed on a plastic board or glass board and the board is bent; and
  a switch in which a conductive line is provided on a board of other materials and the shape of the board is changed by an application of physical force or damage to the board and thus mode setting becomes impossible.

For example, the EPD panel 100 receives, from an external server and stores in the memory 420, table data in which on/off states of the mode switch unit 150 and operation modes of the EPD panel 100 (including processes and conditions of the operation modes) are mapped to each other in one-to-one correspondence. Thereafter, a manager, or a user of the EPD panel 100 sets the EPD panel 100 by using the mode switch unit 150. The user of the EPD panel 100 is restricted to using the EPD panel 100 according to the set operation mode.

In the following first embodiment, the mode switch unit 150 includes multiple mode switches having corresponding electrode line patterns, for example.

Figure 10A:
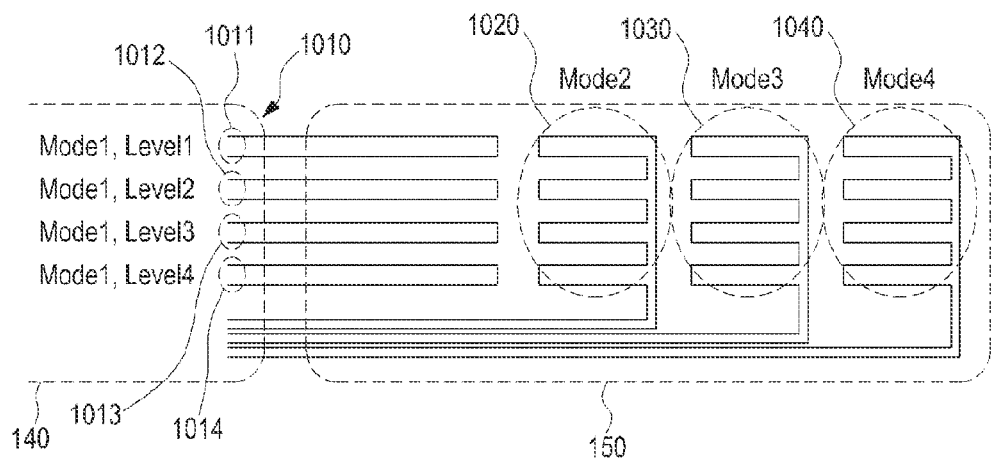
FIGS. 10A and 10B illustrate a configuration of a mode switch unit according to an embodiment of the present invention.
Figure 10B:
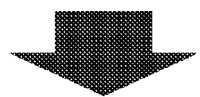
Figure 10B:
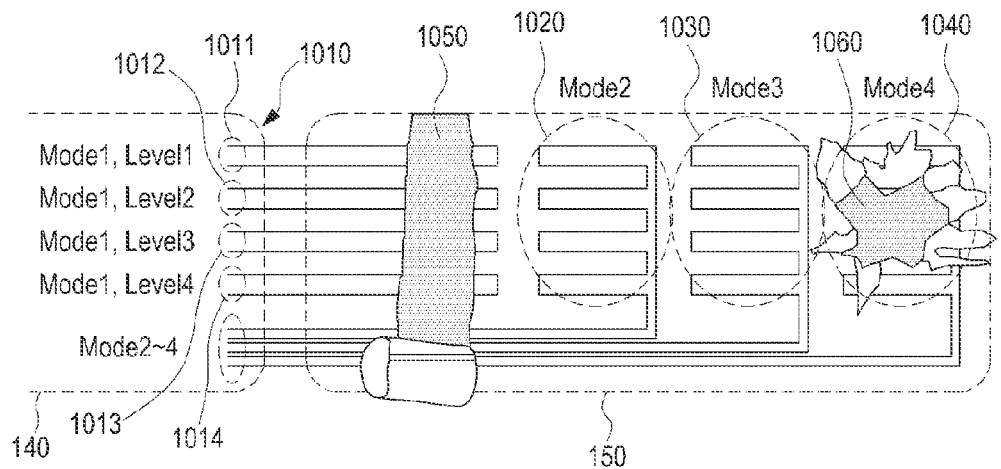

FIGS. 10A and 10B illustrate a configuration of the mode switch unit 150 according to an embodiment of the present invention.

Referring to FIG. 10A, the mode switch unit 150 includes a first mode switch 1010, which has a first level switch 1011, a second level switch 1012, a third level switch 1013, and a fourth level switch 1014. The mode switch unit 150 further includes a second mode switch 1020, a third mode switch 1030, and a fourth mode switch 1040. When the first mode switch 1010 is used as a timer, an effective time for each level may be set to be one hour because a total of 4 levels exist. When the first through fourth level switches 1011-1014 are not cut at all, an effective time may be set to be five hours. When the first through fourth level switches 1011-1014 are entirely cut, an effective time may be set to be one hour.

The first mode switch 1010 may be used to set a time or a range. If a time limit is put on security setting of the EPD panel 100 and thus content is set to be destructed after the time limit has elapsed, time setting is required. If the first mode switch 1010 is not cut at all, a security level is regarded to be low and content is allowed to be used for an extended time period. As more of the first through fourth level switches 1011-1014 are sequentially cut, the security level increases. For example, if 5-hour use is set when the first mode switch 1010 is not cut, then 4-hour use is possible when the first level switch 1011 is cut and 3-hour use is possible when the second level switch 1012 is cut. In this way, time-based setting is possible. When lower parts under the fourth level switch 1014 are cut, setting is made as a case where a high security level is required. When all of the first through fourth mode switches 1010, 1020, 1030, and 1040 are cut, all security mode setting is made at the same time. The second through fourth mode switches 1020, 1030, and 1040 are configured such that security mode setting is made when they are simply perforated or cut. The second through fourth mode switches 1020, 1030, and 1040 turn on/off a particular mode or a particular security function. When the second through fourth mode switches 1020, 1030, and 1040 are not cut, security mode setting is turned off; when they are cut, security mode setting is turned on.

Referring to FIG. 10B, the first through fourth mode switches 1010-1040 are switched from an off state to an on state when the user cuts them by using a finger, scissors, a punch, or the like. Reference numeral 1050 indicates a trace remaining after the user cuts the first through fourth mode switches 1010-1040 by using scissors, a knife, a finger, or the like. Reference numeral 1060 indicates a trace remaining after the user cuts the fourth mode switch 1040 by using a punching tool.

FIGS. 11A through 11D are diagrams describing the operation of the switch controller 480.

Figure 11A:
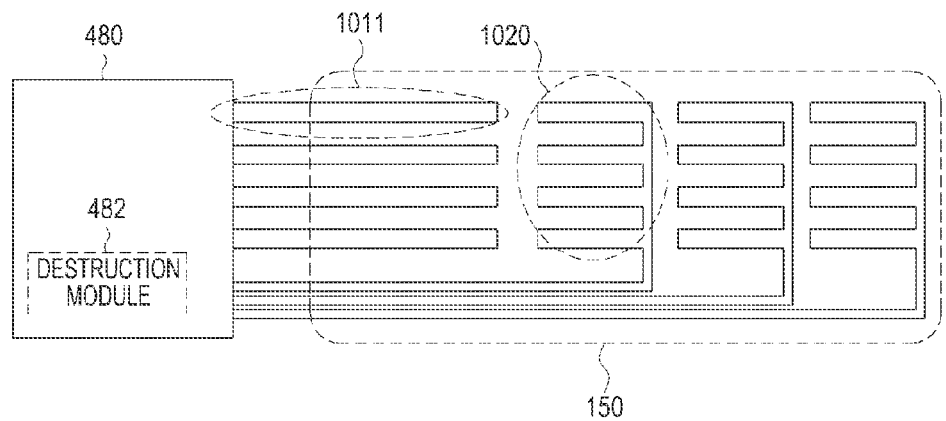
FIGS. 11A through 11D illustrate an operation of a switch controller according to an embodiment of the present invention.

Referring to FIG. 11A, the switch controller 480 periodically or aperiodically monitors on/off states of the first through fourth mode switches 1010-1040 under control of the controller 200, and outputs a monitoring result to the controller 200. That is, the switch controller 480 applies reference signals $V_{dd}$ to the first through fourth mode switches 1010-1040 and senses resistances of the first through fourth mode switches 1010-1040, thus determining on/off states of the respective mode switches 1010-1040. Each mode switch has a relatively low resistance (low-z) when it is not cut, and has a relatively high resistance (high-z) when it is cut.

Figure 11B:
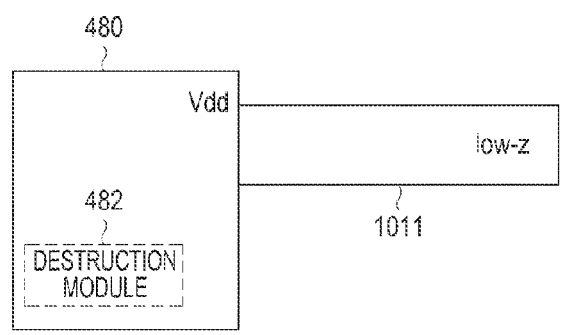

Referring to FIG. 11B, the switch controller 480 applies a reference signal to the first level switch 1011 that is not cut, measures a resistance of the first level switch 1011, and determines that the first level switch 1011 is in an off state when the measured resistance is less than a preset reference resistance.

Figure 11C:
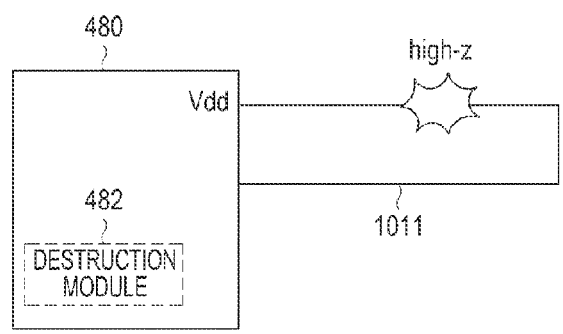

Referring to FIG. 11C, the switch controller 480 applies a reference signal to the first level switch 1011 that is cut, measures a resistance of the first level switch 1011, and determines that the first level switch 1011 is in an on state when the measured resistance exceeds the preset reference resistance.

Figure 11D:
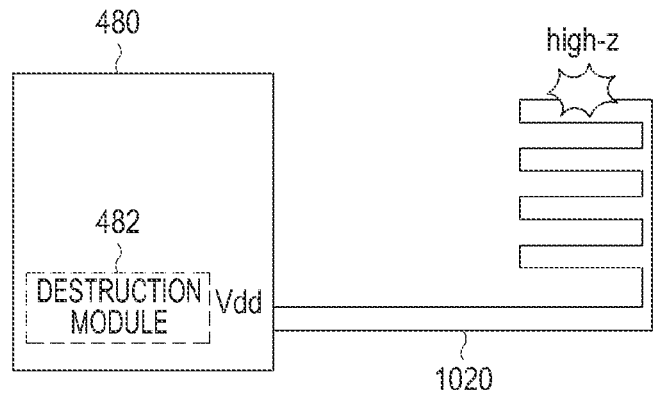
Figure 12:
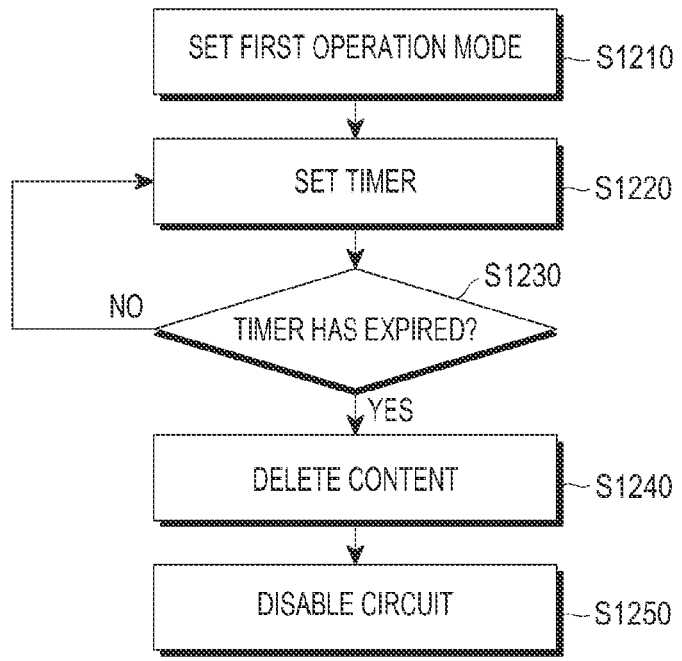

Referring to FIG. 11D, the switch controller 480 applies a reference signal to the second mode switch 1020 that is cut, measures a resistance of the second mode switch 1020, and determines that the second mode switch 1020 is in an on state when the measured resistance exceeds the preset reference resistance.

The user may set an operation mode of the EPD panel 100 by using the first through fourth mode switches 1010-1040. The controller 200 may set the operation mode of the EPD panel 100 based on combined on/off states of the first through fourth mode switches 1010-1040. For example, the on/off states of the second through fourth mode switches 1020-1040 may form 8 combinations ($2^3$), and different operation modes corresponding to the each of the respective combinations may be set.

The switch controller 480 may include a destruction module 482 for disabling operations of main internal circuits of the EPD panel 100. The destruction module 482 may include, for example, fuses positioned in the middle of circuits that interconnect main components of the EPD panel 100, such as the memory 420 and the power manager 440, and the memory 420 and the controller 200.

Hereinafter, a description will be made of a method for deleting content of the EPD panel 100 according to an effective time that is set by the user by using the first mode switch 1010.

FIG. 12 and FIGS. 13A through 13D are diagrams describing a first operation mode of the EPD panel 100. An effective time of 30 minutes is previously set for the first through fourth level switches 1011-1014 of the first mode switch 1010. In FIGS. 13A through 13D, the EPD panel 100 over time is overlappingly illustrated.

In step S1210, the user sets an effective time of the EPD panel 100 by using the first mode switch 1010. For example, when the user cuts the first level switch 1011 and the second level switch 1012 at the same time, an effective time of the EPD panel 100 may be set to 1 hour. When the user cuts the first through third level switches 1011-1013 at the same time, the effective time of the EPD panel 100 may be set to 1 hour and 30 minutes. Referring to FIG. 13A, an indicator 1310 (a timer text or image) indicating that the effective time of the EPD panel 100 is set is displayed on the imaging sheet 120.

In step S1220, the controller 200 receives on/off states of the first mode switch 1010 from the switch controller 480, and sets a timer to the user-set effective time that is determined from the on/off states of the first mode switch 1010. The timer may be an element provided in the controller 200 or may be a program using an internal clock of the controller 200.

In step S1230, the controller 200 determines whether the timer has expired. If the timer has expired, the controller 200 performs step S1240; otherwise, if the timer has not expired, the controller 200 periodically performs step S1230. Referring to FIG. 13B, an indicator 1320 (that is, a timeout text or image) indicating that the timer has expired may be displayed.

In step S1240, the controller 200 deletes content stored in the memory 420. The controller 200 may delete all data stored in the memory 420 or main data of the stored data. The controller 200 controls the EPD controller 460 and the driving unit 470 to delete an image displayed on the imaging sheet 120 from a screen. Referring to FIG. 13C, an indicator 1330 (that is, a delete text or image) indicating that content stored in the memory 420 is deleted may be displayed.

In step S1250, the controller 200 operates the destruction module 482 to disable main internal circuits of the EPD panel 100. Referring to FIG. 13D, an indicator 1340 (that is, a terminate text or image) indicating that the main internal circuits of the EPD panel 100 are disabled may be displayed.

Hereinafter, a description will be made of a method for deleting content of the EPD panel 100 according to whether the EPD panel 100 leaves a using region thereof, by using the second mode switch 1020.

Figure 14:
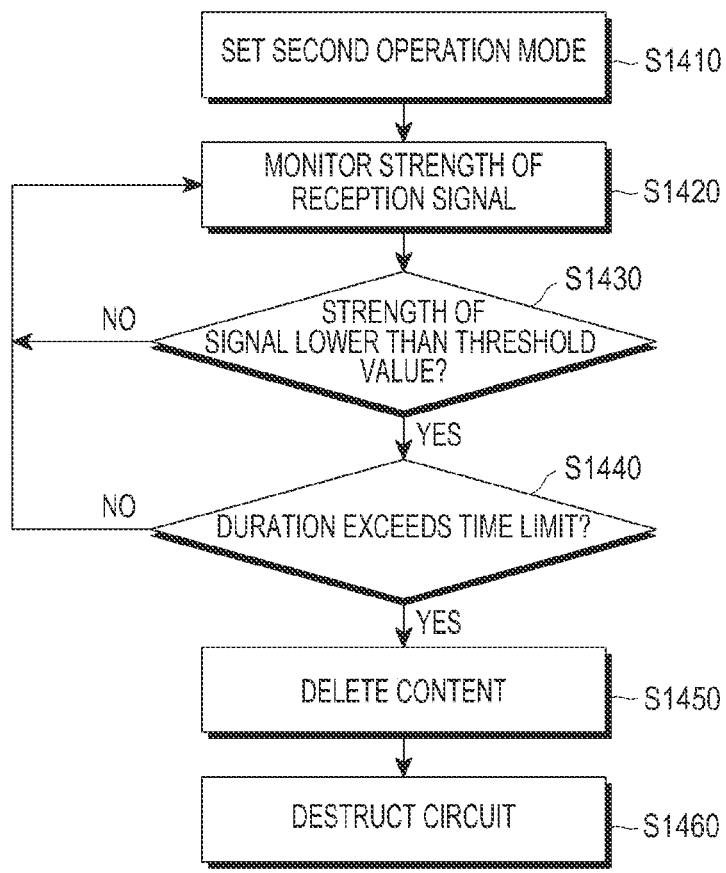
FIG. 14 illustrates a second operation mode of an EPD panel according to an embodiment of the present invention.

FIG. 14 is a diagram describing a second operation mode of the EPD panel 100.

In step S1410, the user sets the second operation mode of the EPD panel 100 by using the second mode switch 1020. The second operation mode limits the using region of the EPD panel 100.

In step S1420, the controller 200 receives on/off states of the second mode switch 1020 from the switch controller 480, and understands from the received on/off states of the second mode switch 1020 that the second operation mode is set by the user. The controller 200 monitors the strength of a signal received from a preset access point (or an arbitrary signal generator) by using the communication unit 450.

In step S1430, the controller 200 determines whether the strength of the received signal is lower than a preset threshold (i.e., whether a reception failure occurs). If the strength of the received signal is lower than the preset threshold, the controller 200 performs step S1440; if the strength of the received signal is higher than the preset threshold, the controller 200 periodically performs step S1420.

In step S1440, the controller 200 determines whether a duration of the reception failure exceeds a preset time limit. If the duration exceeds the time limit, the controller 200 performs step S1450; otherwise, if the duration does not exceed the time limit, the controller 200 performs S1420. To determine whether the duration exceeds the time limit, the controller 200 may set the timer to the preset time limit at a point in time when the reception failure is first sensed. The timer is stopped if the reception failure is solved, and then if a reception failure occurs again, the timer is reset to the time limit.

In step S1450, the controller 200 deletes content stored in the memory 420. The controller 200 may delete all data stored in the memory 420 or main data of the stored data. The controller 200 controls the EPD controller 460 and the driving unit 470 to delete an image displayed on the imaging sheet 120 from a screen.

In step S1460, the controller 200 operates the destruction module 482 to disable main internal circuits of the EPD panel 100.

Hereinafter, a description will be made of a method for deleting content of the EPD panel 100 according to whether review of content is completed, by using the third mode switch 1030.

Figure 15:
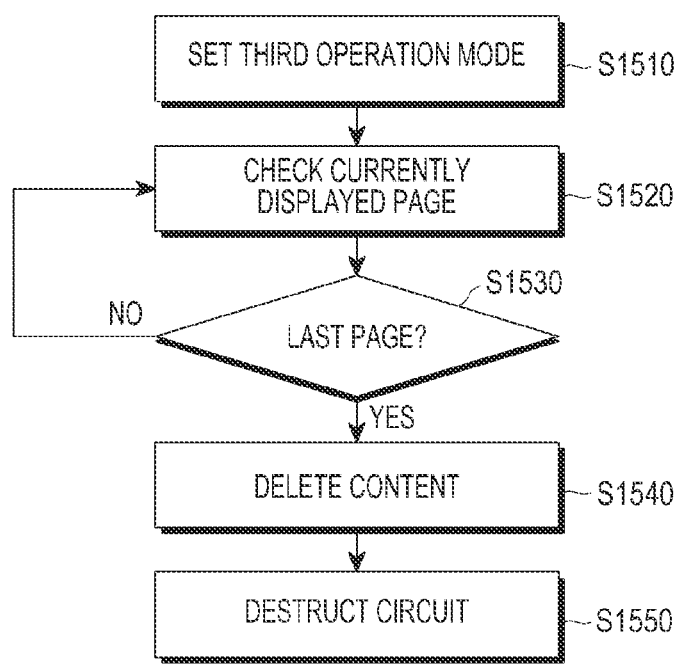
FIGS. 15 and 16 illustrate a third operation mode of an EPD panel according to an embodiment of the present invention.
Figure 16:
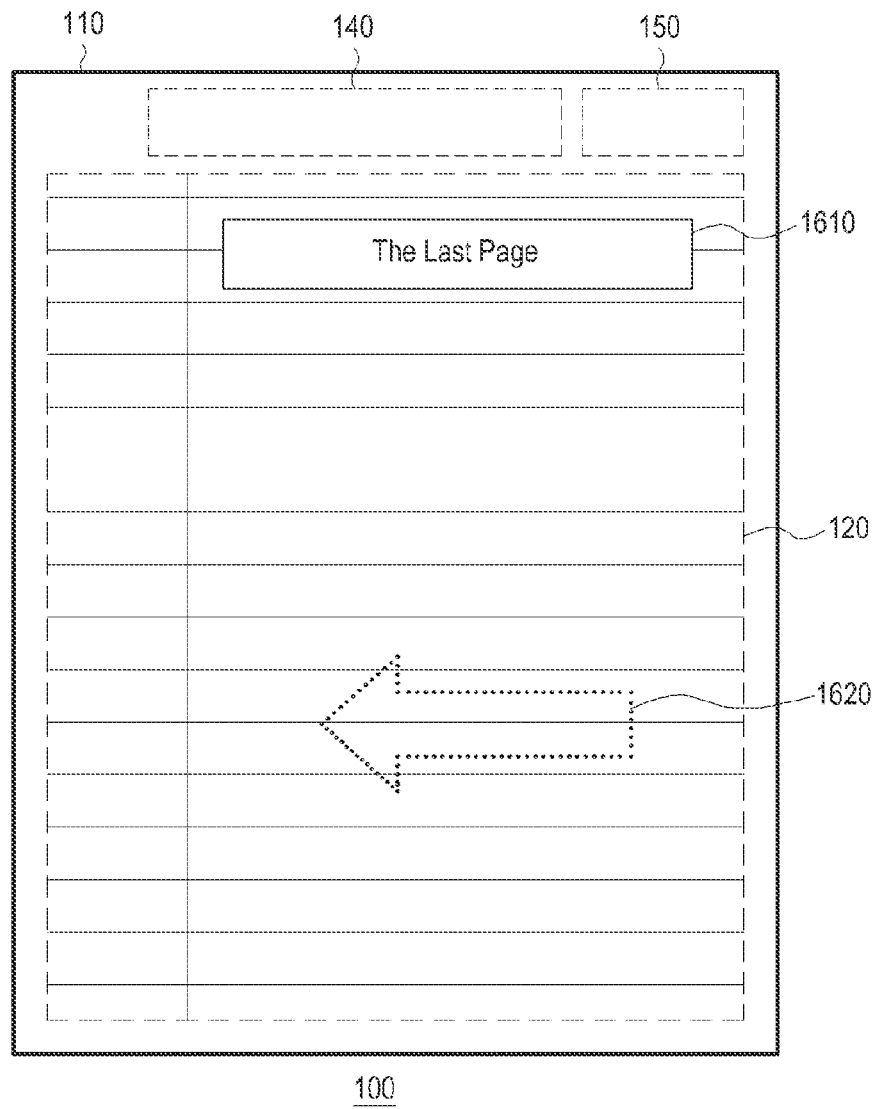

FIGS. 15 and 16 are diagrams describing a third operation mode of the EPD panel 100. In the third operation mode, if the user completes review of the last page of content including at least one page, the controller 200 deletes the content stored in the EPD panel 100.

In step S1510, the user sets the third operation mode of the EPD panel 100 by using the third mode switch 1030.

In step S1520, the controller 200 receives on/off states of the third mode switch 1030 from the switch controller 480, and understands from the received on/off states of the third mode switch 1030 that the third operation mode is set by the user. The controller 200 checks a page currently displayed on the imaging sheet 120.

In step S1530, the controller 200 determines whether the user completes review of the last page of the content displayed on the imaging sheet 120. If it is determined that the user completes review of the last page, the controller 200 performs step S1540; otherwise, if the user has not yet completed review of the last page, the controller 200 performs step S1520 upon detection of a page change corresponding to automatic page passing setting or upon reception of a page passing command from the user. Referring to FIG. 16, when a last page 1610 of content is displayed on the imaging sheet 120, if the user makes a drag 1620 from the right to the left (i.e., inputs a page passing command) on the imaging sheet 120 with a pen (i.e., a user input means), the controller 200 may determine that the user has completed review of the last page 1610 of the content. Alternatively, the controller 200 may determine whether the user completes review of a preset page of the content, instead of the last page of the content, and the controller 200 may perform a subsequent process.

In step S1540, the controller 200 deletes content stored in the memory 420. The controller 200 may delete all data stored in the memory 420 or main data of the stored data. The controller 200 controls the EPD controller 460 and the driving unit 470 to delete the image displayed on the imaging sheet 120 on the screen.

In step S1550, the controller 200 operates the destruction module 482 to disable main internal circuits of the EPD panel 100.

Hereinafter, a description will be made of a method for deleting content of the EPD panel 100 immediately according to a destruction command by using the fourth mode switch 1040.

Figure 17:
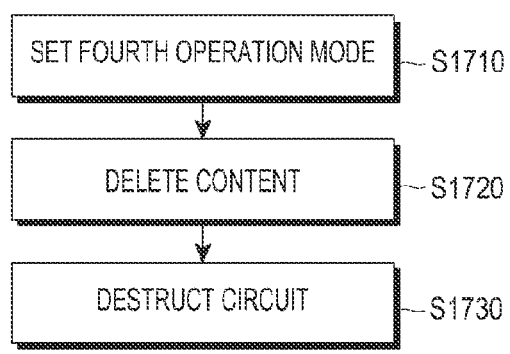
FIG. 17 illustrates a fourth operation mode of an EPD panel according to an embodiment of the present invention.

FIG. 17 is a diagram describing a fourth operation mode of the EPD panel 100. In the fourth operation mode, the user may immediately delete the content of the EPD panel 100 without a waiting time.

In step S1710, the user sets the fourth operation mode of the EPD panel 100 by using the fourth mode switch 1040. The controller 200 receives on/off states of the fourth mode switch 1040 from the switch controller 480, and understands from the received on/off states of the fourth mode switch 1040 that the fourth operation mode is set by the user.

In step S1720, the controller 200 deletes content stored in the memory 420. The controller 200 may delete all data stored in the memory 420 or main data of the stored data. The controller 200 controls the EPD controller 460 and the driving unit 470 to delete an image displayed on the imaging sheet 120 from a screen.

In step S1730, the controller 200 operates the destruction module 482 to disable main internal circuits of the EPD panel 100.

The EPD panel 100 according to the present invention may be configured in various forms depending on positions of the main board 140 and the mode switch unit 150 and whether a binding hole is provided.

Figure 18:
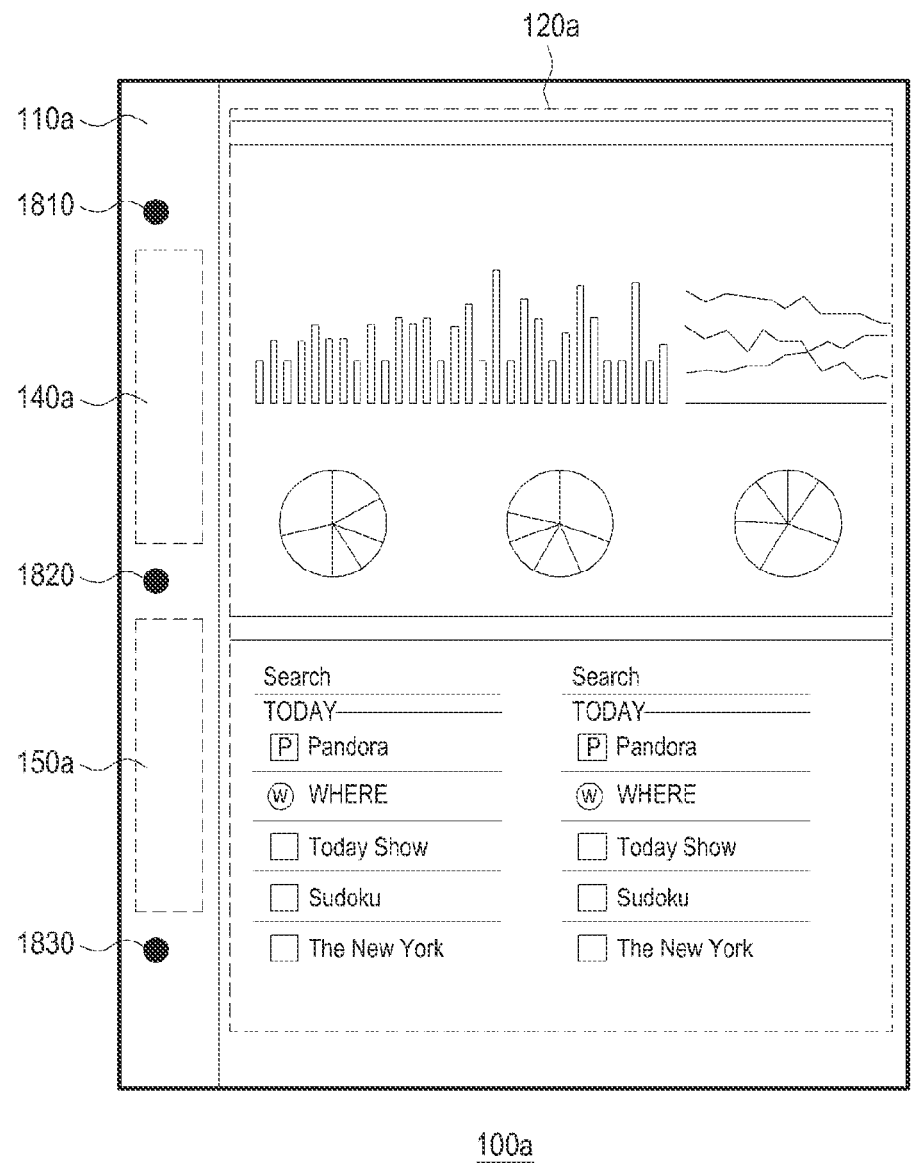
FIG. 18 is a diagram illustrating an EPD panel according to an embodiment of the present invention.

FIG. 18 is a diagram illustrating an EPD panel 100a according to an embodiment of the present invention. The EPD panel 100a includes a cover sheet 110a for protecting other components in the EPD panel 100a, an imaging sheet 120a for displaying content, a touch sensor (not illustrated) for sensing a user input, a main board 140a for driving the imaging sheet 120a and transferring content stored inside or received from outside in the form of an image according to a user command or menu selection input through the touch sensor, and a mode switch unit 150a. The illustrated EPD panel 100a has a configuration that is similar with the EPD panel 100 illustrated in FIG. 1, except that the main board 140a and the mode switch unit 150a are positioned in a left portion of the EPD panel 100a and three holes 1810, 1820, and 1830 for binding are provided on both sides of and between the main board 140a and the mode switch unit 150a. Alternatively, the three holes 1810, 1820, and 1830 of the EPD panel 100a may be substituted by indicators indicating positions at which such holes are to be formed.

Figure 19:
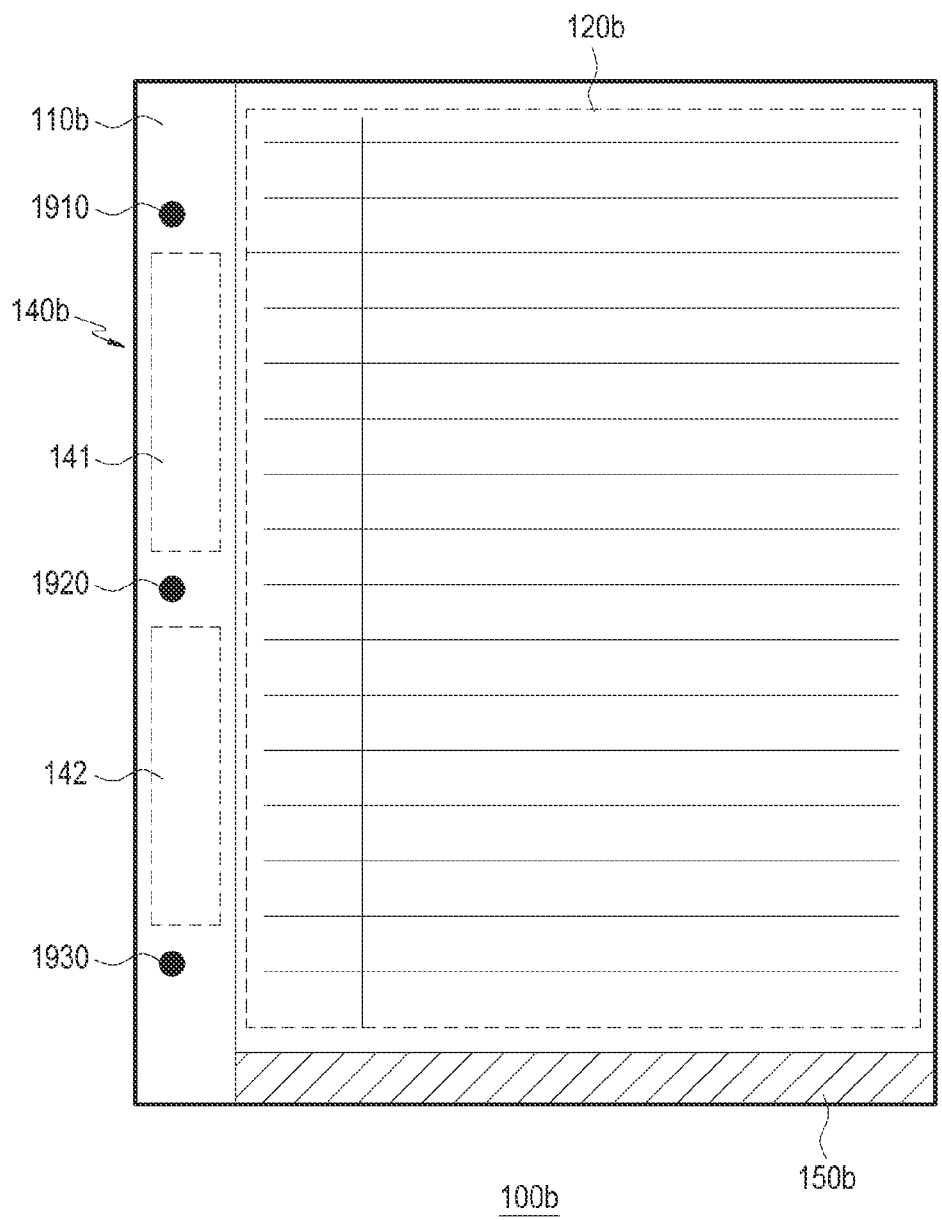
FIG. 19 is a diagram illustrating an EPD panel according to an embodiment of the present invention.

FIG. 19 is a diagram illustrating an EPD panel 100b according to an embodiment of the present invention. The EPD panel 100b includes a cover sheet 110b for protecting other components in the EPD panel 100b, an imaging sheet 120b for displaying content, a touch sensor (not illustrated) for sensing a user input, a main board 140b for driving the imaging sheet 120b and transferring content stored inside or received from outside in the form of an image according to a user command or menu selection input through the touch sensor, and a mode switch unit 150b. The illustrated EPD panel 100b has a configuration that is similar with the EPD panel 100 illustrated in FIG. 1, except that a first portion 141 and a second portion 142 of the main board 140b are positioned in a left portion of the EPD panel 100b, the mode switch unit 150b is positioned in a lower portion of the EPD panel 100b, and three holes 1910, 1920, and 1930 for binding are provided on both sides of and between the first portion 141 and the second portion 142. Since the last portion of the EPD panel 100b viewed by a user is the lower portion, it is desirable to dispose the mode switch unit 150b for usability in the lower portion of the EPD panel 100b.

Figure 20:
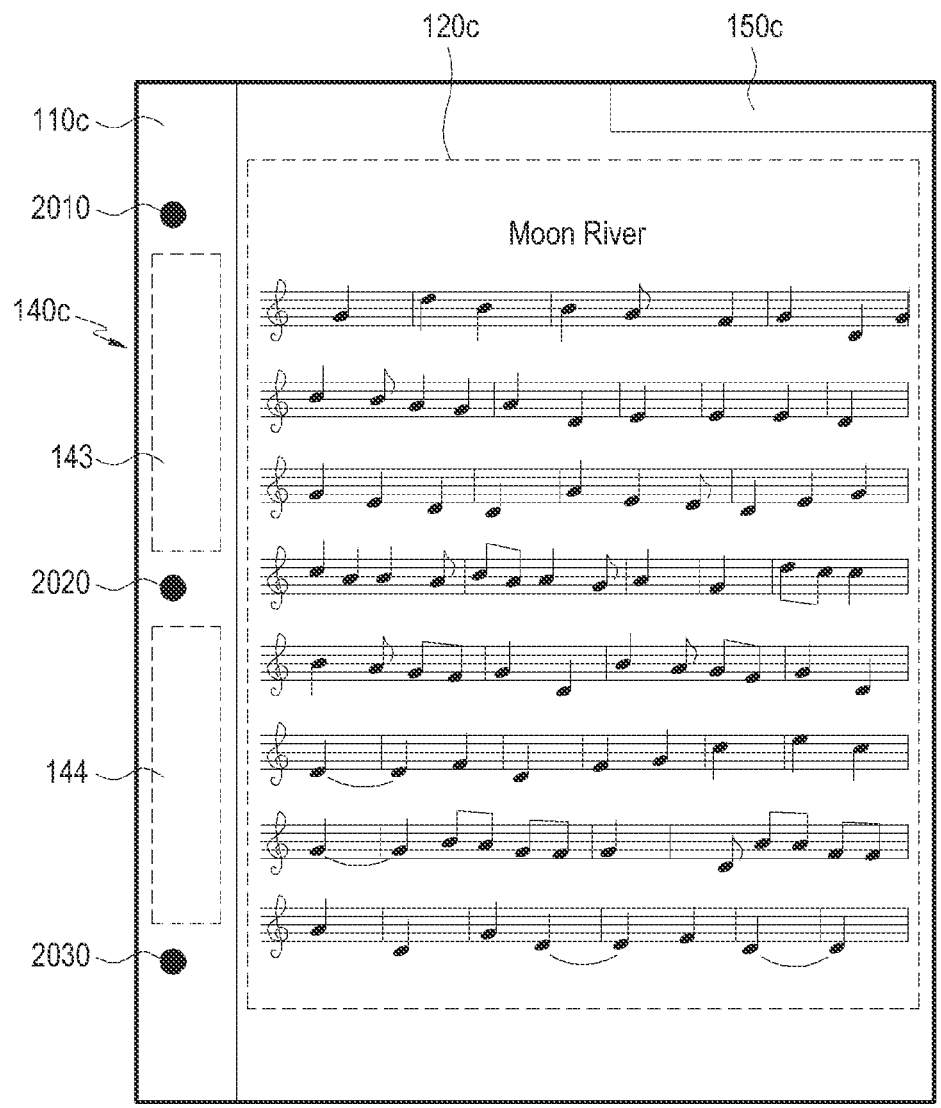
FIG. 20 is a diagram illustrating an EPD panel according to an embodiment of the present invention.

FIG. 20 is a diagram illustrating an EPD panel 100c according to an embodiment of the present invention. The EPD panel 100c includes a cover sheet 110c for protecting other components in the EPD panel 100c, an imaging sheet 120c for displaying content, a touch sensor (not illustrated) for sensing a user input, a main board 140c for driving the imaging sheet 120c and transferring content stored inside or received from outside in the form of an image according to a user command or menu selection input through the touch sensor, and a mode switch unit 150c. The illustrated EPD panel 100c has a configuration that is similar with the EPD panel 100 illustrated in FIG. 1, except that a first portion 143 and a second portion 144 of the main board 140c are positioned in a left portion of the EPD panel 100c, the mode switch unit 150c is positioned in an upper portion of the EPD panel 100c, and three holes 2010, 2020, and 203 for binding are provided on both sides of and between the first portion 143 and the second portion 144. The mode switch unit 150c is placed in a position that makes it easiest to punch or cut, thus improving usability.

As stated above, the mode switch unit according to the present invention may include an electrode line pattern whose on/off state may be set by the user, a mechanical switch like a dome switch, an electronic switch, and so forth.

Hereinafter, a description will be made of a case in which the mode switch unit according to the present invention includes dome switches.

Figure 21:
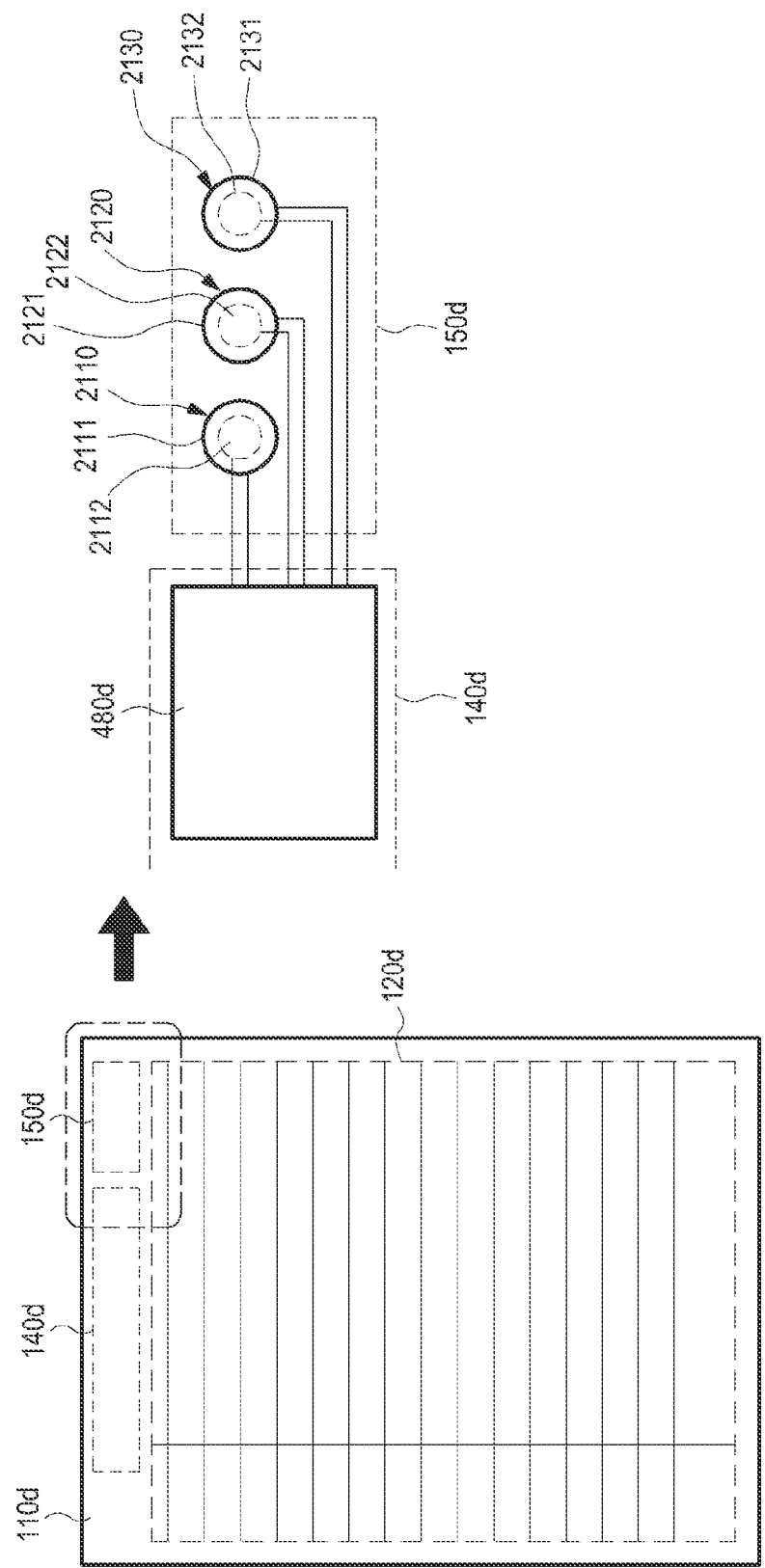
FIG. 21 is a diagram illustrating an EPD panel according to an embodiment of the present invention.

FIG. 21 is a diagram illustrating an EPD panel 100d according to an embodiment of the present invention. The EPD panel 100d includes a cover sheet 110d for protecting other components in the EPD panel 100d, an imaging sheet 120d for displaying content, a touch sensor (not illustrated) for sensing a user input, a main board 140d for driving the imaging sheet 120d and transferring content stored inside or received from outside in the form of an image according to a user command or menu selection input through the touch sensor, and a mode switch unit 150d. The illustrated EPD panel 100d has a configuration that is similar with the EPD panel 100 illustrated in FIG. 1, except for a configuration of the mode switch unit 150d.

More specifically, the mode switch unit 150d includes a first mode switch 2110, a second mode switch 2120, and a third mode switch 2130, which include semi-spherical conductive domes 2111, 2121, and 2131, respectively, and conductive contact members 2112, 2122, and 2132, respectively. In an off state, the conductive domes 2111, 2121, and 2131 and the conductive contact members 2112, 2122, and 2132 are spaced apart (that is, electrically insulated) from each other. When the user presses the conductive domes 2111, 2121, and 2131, the conductive domes 2111, 2121, and 2131 contact the conductive contact members 2112, 2122, and 2132 so that the conductive domes 2111, 2121, and 2131 are electrically connected with the conductive contact members 2112, 2122, and 2132.

The switch controller 480d periodically or aperiodically monitors switching states of the first through third mode switches 2110-2130 under control of a controller (not illustrated), and outputs a monitoring result to the controller. That is, the switch controller 480d applies reference signals to the first through third mode switches 2110-2130, and senses a change of resistances of the first through third mode switches 2110-2130, thus determining the on/off states of the respective mode switches 2110-2130.

For example, the switch controller 480d applies a reference signal to the first mode switch 2110, which is not pressed, measures a resistance of the first mode switch 2110, and determines that the first mode switch 2110 is in an off state if the measured resistance exceeds a preset reference resistance. The switch controller 480d applies a reference signal to the first mode switch 2110 which is pressed, measures the resistance of the first mode switch 2110, and determines that the first mode switch 2110 is in an on state if the measured resistance is less than a preset reference resistance.

In the foregoing embodiments, it has been described that content stored in the memory or displayed on the imaging sheet is deleted from the memory or the screen in each operation mode, but the screen of the imaging sheet may be displayed as a lock mode in another operation mode.

Figure 22:
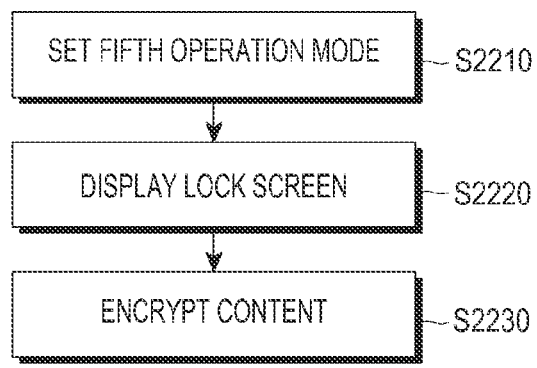

FIG. 22 and FIGS. 23A and 23B are diagrams describing a fifth operation mode of the EPD panel 100d.

In step S2210, the user sets the fifth operation mode of the EPD panel 100d by using the first mode switch 2110. The controller of the main board 140d receives on/off states of the first mode switch 2110 from the switch controller 480d, and understands from the received on/off states of the first mode switch 2110 that the fifth operation mode is set by the user.

In step S2220, if a preset time limit has elapsed, the controller deletes content displayed on the imaging sheet 120d from the screen and displays a lock screen on the imaging sheet 120d.

Referring to FIG. 23A, content 2310 that needs protection is displayed on the imaging sheet 120d. Referring to FIG. 23B, the content 2310 displayed on the imaging sheet 120d is deleted from the screen, and a lock screen 2320 that needs input of a password is displayed on the imaging sheet 120d. The password may be set in advance by a manager or the user.

The controller encrypts content stored in a memory (not illustrated) of the main board 140d with the password, and deletes the password from the memory.

Thereafter, if the user or the manager inputs a valid password, the controller decrypts the encrypted content stored in the memory and displays the decrypted content on the imaging sheet 120d.

Alternatively, if a preset second time limit has elapsed without input of the password after display of the lock screen, the foregoing content deletion and circuit destruction steps may be performed in another operation mode.

Such a lock screen display and content encryption may be applied immediately prior to content deletion in the above-described first through third operation modes, or as described above, if a preset time limit has elapsed without input of the password after display of the lock screen, subsequent content deletion and circuit destruction steps may be performed.

According to the present invention, electronic paper according to the present invention may be used in a similar manner as conventional flexible, thin, and cheap paper and have improved security.

The embodiments of the present invention may be implemented with hardware, software, or a combination of hardware and software. The software may be stored in a volatile or non-volatile storage such as a Read-Only Memory (ROM), a memory such as a Random Access Memory (RAM), a memory chip, a device, or an integrated circuit, and an optically or magnetically recordable and machine (e.g., computer)-readable storage medium such as a Compact Disc (CD), a Digital Versatile Disk (DVD), a magnetic disk, or a magnetic tape. A memory which can be included in the audio content playback apparatus includes, for example, a machine-readable storage medium which is suitable for storing a program or programs including instructions for implementing the audio content playback method according to the embodiment of the present invention. Therefore, the present invention includes a program including codes for implementing the audio content playback apparatus or method according to the embodiments of the present invention and a machine-readable storage medium for storing such a program. The program may be electronically transferred through a medium such as a communication signal delivered through wired or wireless connection, and the present invention properly includes equivalents thereof.

The portable device may receive and store the program from a program providing device connected in a wired or wireless manner. The program providing device may include a memory for storing a program including instructions for instructing the electronic paper to execute a preset operating mode, information necessary for the operating mode, a communication unit for performing wired or wireless communication with the electronic paper, and a controller for transmitting a corresponding program to the electronic paper at the request of the electronic paper or automatically.

While the present invention has been particularly illustrated and described with reference to certain embodiments thereof, various modifications or changes can be made without departing from the scope of the present invention. Therefore, the scope of the present invention is not limited to the described embodiments, should be defined by the scope of the following claims and any equivalents thereof.

What is claimed is:

1. Electronic paper comprising:
an imaging sheet configured to display content;
a memory configured to store the content;
a mode switch unit configured to manually set an operation mode of the electronic paper; and
a controller configured to perform at least one operation from a plurality of operations including encryption of the content stored in the memory, deletion of the content stored in the memory, deletion of content displayed on the imaging sheet from a screen, and display of a lock screen that requires input of a password on the imaging sheet, according to an operation mode that is set by a user using the mode switch unit,
wherein the mode switch unit comprises a plurality of mode switches, each of which manually switches between an off state and an on state, and
wherein the operation mode of the electronic paper is manually set based on combined on and off states of the plurality of mode switches.

2. The electronic paper of claim 1, wherein each of the plurality of mode switches is switched to an on state from an off state when each of the plurality of mode switches is cut.

3. The electronic paper of claim 1, wherein the controller disables at least some of internal circuits of the electronic paper.

4. The electronic paper of claim 1, wherein the mode switch unit comprises a plurality of level switches to which respective time limits are allocated, and the controller performs the at least one operation after a sum of the allocated time limits of at least one of the level switches that are switched to the on state has elapsed.

5. The electronic paper of claim 1, wherein the controller performs the at least one operation if a strength of a signal received from outside is lower than a predetermined threshold value.

6. The electronic paper of claim 1, wherein the controller performs the at least one operation after display of a predetermined page of the content.

7. The electronic paper of claim 1, wherein the controller performs the at least one operation immediately without a waiting time, if the operation mode is set.

\* \* \* \* \*